United States Patent
Hess et al.

(10) Patent No.: US 10,132,383 B2
(45) Date of Patent: Nov. 20, 2018

(54) CENTRIFUGAL PENDULUM ABSORBER FOR A TORQUE CONVERTER

(71) Applicant: Schaeffler Technologies AG & Co. KG, Herzogenaurach (DE)

(72) Inventors: Timothy Hess, Westlake, OH (US); Nigel Gurney, Wooster, OH (US); Matthew Smith, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 218 days.

(21) Appl. No.: 15/097,766

(22) Filed: Apr. 13, 2016

(65) Prior Publication Data

US 2017/0299015 A1    Oct. 19, 2017

(51) Int. Cl.
*F16F 15/14* (2006.01)
*F16F 15/30* (2006.01)
*F16H 41/00* (2006.01)
*F16H 39/42* (2006.01)

(52) U.S. Cl.
CPC ............ *F16F 15/145* (2013.01); *F16F 15/30* (2013.01); *F16H 39/42* (2013.01); *F16H 41/00* (2013.01)

(58) Field of Classification Search
CPC .... F16F 15/14; F16F 15/1407; F16F 15/1414; F16F 15/1421; F16F 15/1428; F16F 15/1435; F16F 15/145; F16F 15/30; F16H 41/00; F16H 39/42
See application file for complete search history.

(56) References Cited

U.S. PATENT DOCUMENTS

| | | | | |
|---|---|---|---|---|
| 4,063,623 A | * | 12/1977 | Ivey | F16D 43/18 192/103 B |
| 8,720,658 B2 | * | 5/2014 | Ito | F16F 15/145 192/3.29 |
| 8,881,622 B2 | | 11/2014 | Maienschein et al. | |
| 9,038,793 B2 | * | 5/2015 | Krause | F16F 15/145 188/378 |
| 9,360,081 B2 | * | 6/2016 | Lee | F16F 15/1343 |
| 9,709,127 B2 | * | 7/2017 | Takikawa | F16F 15/145 |

(Continued)

FOREIGN PATENT DOCUMENTS

| | | | | |
|---|---|---|---|---|
| DE | 102016216935 A1 | * | 3/2017 | ............ F16F 15/145 |
| DE | 102016221153 A | * | 5/2017 | ............... F16D 3/12 |

(Continued)

*Primary Examiner* — Adam D Rogers
(74) *Attorney, Agent, or Firm* — Davidson, Davidson & Kappel, LLC

(57) ABSTRACT

A centrifugal pendulum absorber for a torque converter is provided. The centrifugal pendulum absorber includes a center plate; a roller received in a roller slot formed in the center plate; and a first mass on a rear axial side of the center plate and a second mass on a front axial side of the center plate. The first and second masses are slidable with respect to the center plate along the slot roller. The first mass includes a first radially extending section and a first axial protrusion extending axially past a rear-side axial surface of the first radially extending section. The second mass includes a second radially extending section and a second axial protrusion extending axially past a front-side axial surface of the second radially extending section. A torque converter and a method of forming a centrifugal pendulum absorber are also provided.

20 Claims, 3 Drawing Sheets

(56) References Cited

U.S. PATENT DOCUMENTS

| | | | | |
|---|---|---|---|---|
| 2015/0323041 A1* | 11/2015 | Takikawa | .............. | F16F 15/145 |
| | | | | 192/3.29 |
| 2016/0025147 A1* | 1/2016 | Dinger | .............. | F16F 15/12373 |
| | | | | 60/327 |
| 2017/0146090 A1* | 5/2017 | Dinger | .................. | F16F 15/145 |
| 2017/0234416 A1* | 8/2017 | Kawahara | ............... | F16H 45/02 |
| | | | | 192/3.28 |
| 2017/0350470 A1* | 12/2017 | Wada | ...................... | F16F 15/14 |

FOREIGN PATENT DOCUMENTS

| | | | | | |
|---|---|---|---|---|---|
| DE | 102016202937 A1 | * | 8/2017 | ............. | F16F 15/14 |
| FR | 3032762 B1 | * | 7/2017 | ............ | F16F 15/145 |
| JP | 2016125606 A | * | 7/2016 | ............ | F16F 15/134 |
| WO | WO-2014005903 A1 | * | 1/2014 | ........ | F16F 15/12373 |
| WO | WO-2015192840 A1 | * | 12/2015 | ............ | F16F 15/145 |
| WO | WO-2016012707 A1 | * | 1/2016 | ............ | F16F 15/145 |

* cited by examiner

CENTRIFUGAL PENDULUM ABSORBER FOR A TORQUE CONVERTER

The present disclosure relates generally to torque converters and more specifically to centrifugal pendulum absorbers of torque converters.

BACKGROUND

U.S. Pat. No. 8,881,622 discloses a centrifugal pendulum absorber including conventional masses.

SUMMARY OF THE INVENTION

A centrifugal pendulum absorber for a torque converter is provided. The centrifugal pendulum absorber includes a center plate; a roller received in a roller slot formed in the center plate; and a first mass on a rear axial side of the center plate and a second mass on a front axial side of the center plate. The first and second masses are slidable with respect to the center plate along the roller slot. The first mass includes a first radially extending section and a first axial protrusion extending axially past a rear-side axial surface of the first radially extending section. The second mass includes a second radially extending section and a second axial protrusion extending axially past a front-side axial surface of the second radially extending section.

A torque converter is also provided. The torque converter includes a turbine and the centrifugal pendulum absorber. An axial rearmost surface of the first axial protrusion extends axially past an axial frontmost surface of the turbine.

A method of forming a centrifugal pendulum absorber for a torque converter is also provided. The method includes forming a first mass including a first radially extending section and a first axial protrusion; forming a second mass including a second radially extending section and a second axial protrusion; providing a roller in a slot in a center plate; and providing the first and second masses on the roller such that the first and second masses are slidable with respect to the center plate, the first axial protrusion extends axially past a rear-side axial surface of the first radially extending section, and the second axial protrusion extends axially past a front-side axial surface of the second radially extending section.

BRIEF DESCRIPTION OF THE DRAWINGS

The present invention is described below by reference to the following drawings, in which.

DETAILED DESCRIPTION

The present disclosure provides a winged shaped stamped pendulum mass aimed to increase intermediate inertial effects. The design accommodates a constricting customer envelope, while the winged portion utilizes free space. A patterned wing design can be utilized if spacer bolts/rivets need to be located at outer diameter of the pendulum mass.

Figure 1:
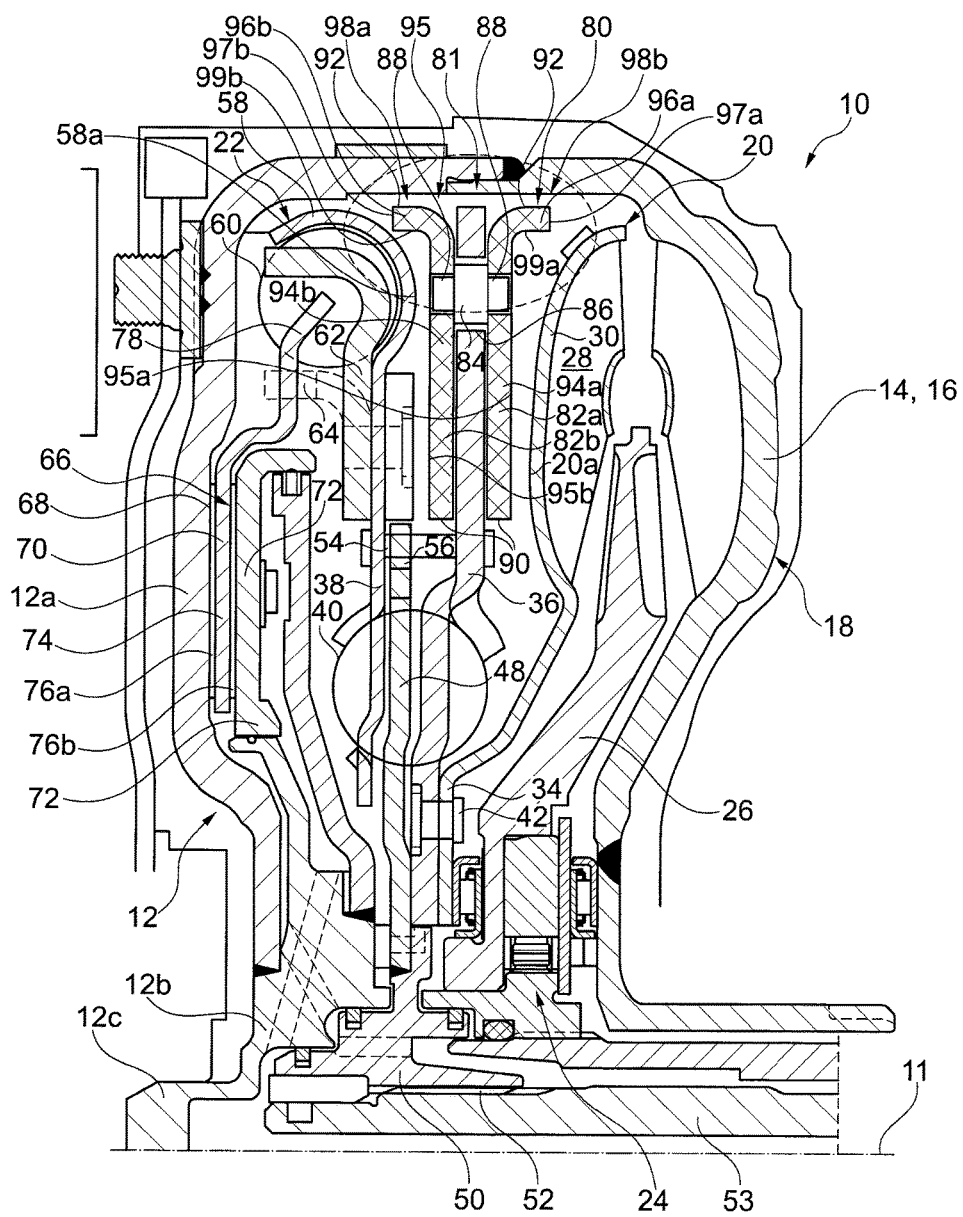
FIG. 1 schematically shows a cross-sectional side view of a torque converter including a CPA according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. Front cover 12 includes cup shaped section 12a for connecting to a rear cover 14 and a hub section 12b including a pilot 12c for aligned with the crankshaft. Torque converter 10 also includes a turbine 20, which is positioned opposite impeller 18, and a damper assembly 22 fixed to turbine 20. Torque converter 10 further includes a stator 26 axially between impeller 18 and turbine 20 and a one-way clutch 24 supporting stator 26. Turbine 20 includes a plurality of blades 28 supported on a rounded portion 30 of turbine 20 at a rear-cover side of turbine 20. Turbine 20 further includes an inner radial extension 34 protruding radially inward from rounded portion 30. On a front-cover side of turbine 20, turbine 20 is connected to damper assembly 22.

Damper assembly 22 includes two cover plates 36, 38 supporting an inner set of springs 40 axially therebetween, with the turbine-side cover plate 36 being riveted to turbine 20 by a plurality of circumferentially spaced rivets 42. Damper assembly 22 also includes a drive flange 48 positioned axially between cover plates 36, 38. Drive flange 48 includes a drive hub 50 at an inner radial end thereof including splines 52 on an inner circumferential surface thereof configured for nonrotatably connecting to a transmission input shaft 53. Cover plates 36, 38 transfer torque from turbine 20 to drive flange 48 via springs 40. Drive flange 48 in turn drives the transmission input shaft via hub 50. Radially outside of springs 40, cover plates 36, 38 are riveted together by a plurality of circumferentially spaced rivets 54. Rivets 54 pass through cover plates 36, 38 into circumferential spaces formed between outer tabs 56 extending from a radial outer end of drive flange 48.

A radially outer end of cover plate 38 forms a spring retainer 58 retaining a set of radially outer springs 60. A further plate 62 of damper assembly 22 is riveted to a front cover side of cover plate 38 and extends into circumferential spaces between springs 60 to form axial end stops for springs 60. Plate 62 further includes projections 64 extending axially away from cover plate 38.

Torque converter 10 also includes a lockup clutch 66 formed by an inner axial surface 68 of front cover 12, a clutch plate 70 and a piston 72. Clutch plate 70 includes a radially extending engagement section 74 including friction material 76a, 76b on both axial surfaces thereof. Clutch plate 70 further includes drive projections 78 on a radial outer end thereof extending through circumferential spaces between projections 64 and into the circumferential spaces between springs 60.

Damper assembly 22 further includes a centrifugal pendulum absorber (CPA) 80 in accordance with an embodiment of the present invention at a radially outer end 81 of cover plate 36, which forms a center plate of CPA 80. CPA 80 further two sets of masses—a set of masses 82a facing a rear cover side of torque converter 10 and a set of masses 82b facing a front cover side of torque converter 10—on opposite axial sides of cover plate 36 at an outer radial end 81 of cover plate 36. Each set of masses 82a, 82b includes a plurality of masses circumferentially offset from each other. In one preferred embodiment, CPA 80 includes four masses 82a and four masses 82b.

Masses 82a, 82b are circumferentially movable with respect to cover plate 36 by rollers 84 that are each received in curved or profiled slots in cover plate 36 and both masses 82a, 82b of the respective set. More specifically, cover plate 36 includes a plurality of circumferentially spaced and radially aligned elongated track slots 86 extending circumferentially therein and masses 82a, 82b include circumferentially extending slots 88. Masses 82a, 82b are fixed together by spacer bolts extending axially through circumferentially extending slots 88, which are circumferentially offset from slots 86. Each mass 82a, 82b includes an inner circumferential surface 90 and an outer circumferential surface 92. Extending between surfaces 90, 92, masses 82a, 82b each include respective a radially extending section 94a, 94b, which is perpendicular to center axis 11.

At a radially outermost end 95 of the respective radially extending section 94a, 94b, masses 82a, 82b each includes a respective axial protrusion, in the form of an extending wing 96a, 96b protruding from radially extending section 94a, 94b away from cover plate 36. Wings 96a, 96b are each formed integrally with the respective radially extending section 94a, 94b as a single piece. Masses 82a each include a wing 96a protruding axially away from radially extending section 94a toward rear cover 14 and masses 82b each include a wing 96b protruding axially away from radially extending section 94b toward front cover 12. Accordingly, wing 96a protrudes axially past a rear side facing radially extending surface 95a of radially extending section 94a and wing 96b protrudes axially past a front side facing radially extending surface 95b of radially extending section 94b. In this embodiment, wings 96a, 96b each extend along the entire circumferential length of the outer circumferential surface 92 of the respective mass 82a, 82b and wings 96a, 96b extend approximately parallel to center axis 11. An axial rearmost surface 97a of a free axial end 98a of wing 96a extends axially past an axial frontmost surface 20a of turbine 20 and an axial frontmost surface 97b of a free axial end 98b of wing 96b extends axially past an axial rearmost surface 58a of spring retainer 58. Wings 96a, 96b each include a respective axially extending inner circumferential surface 99a, 99b extending axially away from the respective radially extending surface 95a, 96a toward the respective free axial end 98a, 98b. Wings 96a, 96b utilize previously unused space, specifically space radially outside of frontmost surface 20a and space radially outside of rearmost surface 58a, to increase the intermediate inertia provided by CPA 80 in comparison with CPAs including conventional masses.

Figure 2A:
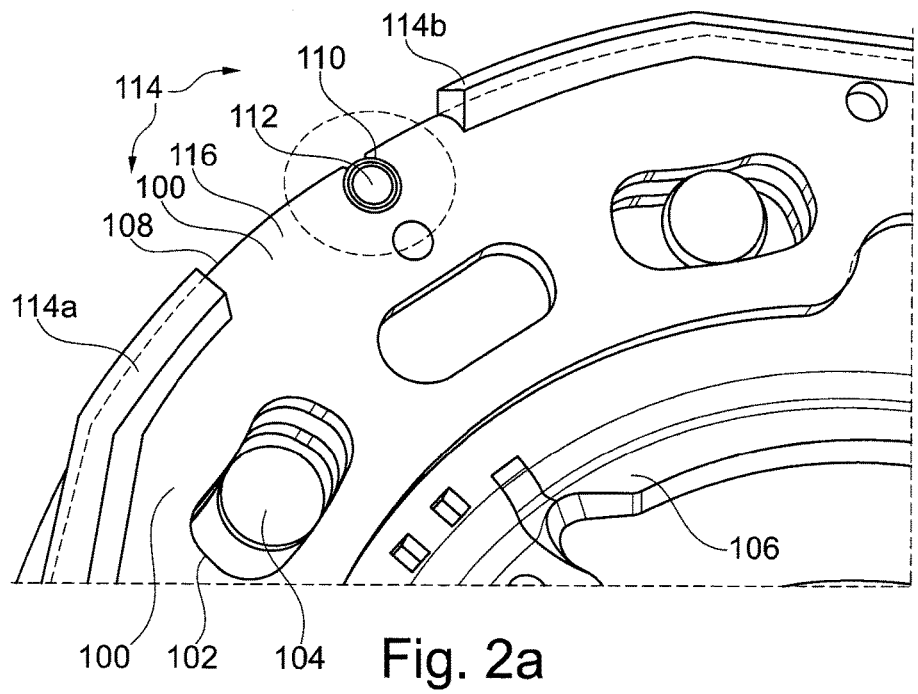
FIGS. 2a and 2b show views of a portion of a mass in accordance with an alternative embodiment of the present invention.
Figure 2B:
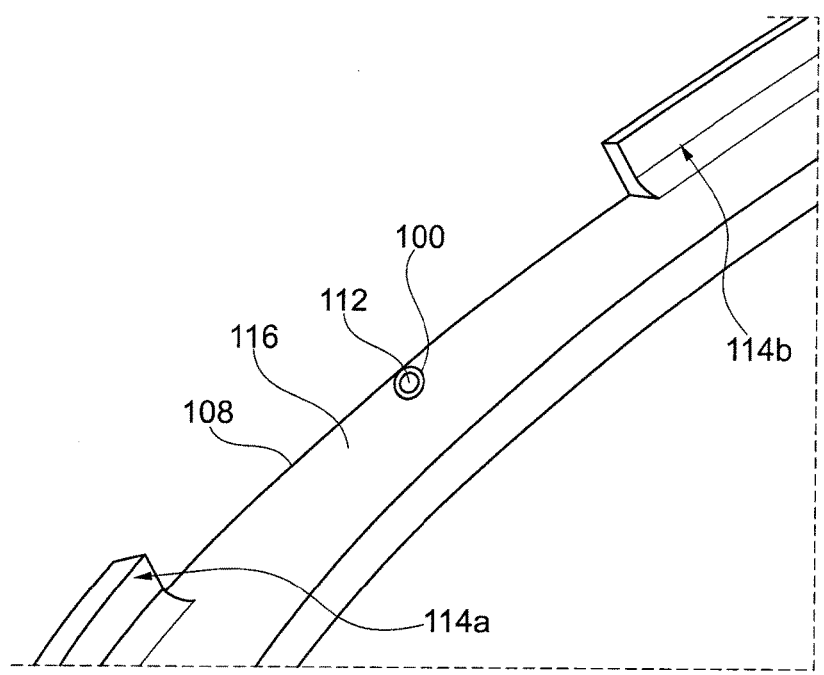

FIGS. 2a and 2b show views of a portion of a mass 100 in accordance with an alternative embodiment of the present invention. Mass 100 includes slots 102 receiving rollers 104 allowing mass 100 to slide circumferentially with respect to a cover plate 106 to which mass 100 is connected. At an outer circumferential surface 108 of mass 100, a through hole 110 is provided that receives a spacer or bolt 112 to fix mass 100 to a further mass on an opposite axial side of cover plate 106 as mass 100. In order to accommodate spacer or bolt 112, a wing 114 at outer circumferential surface 108 is split into two wing sections 114a, 114b, with a flat space 116 provided therebetween for allowing tooling to install spacer or bolt 112.

Figure 3:
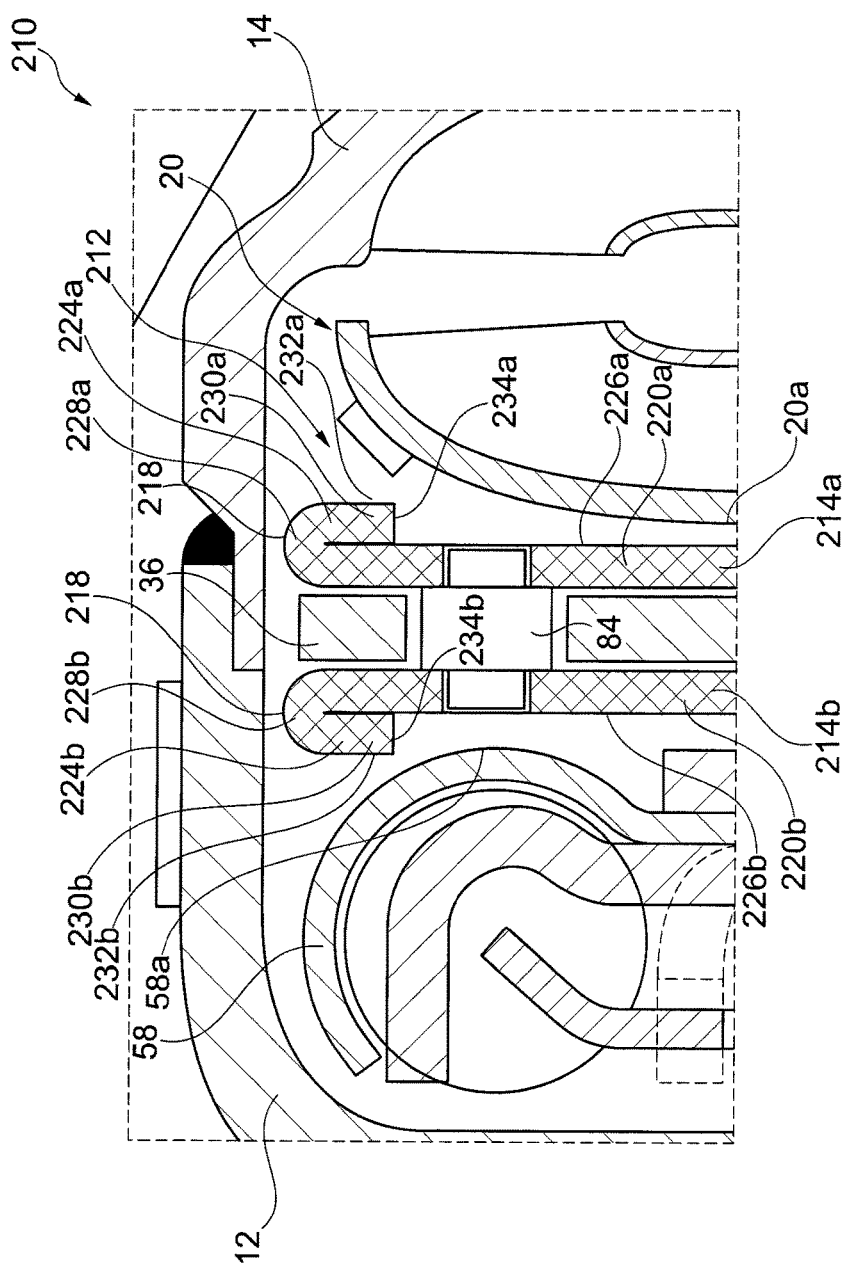
FIG. 3 shows a torque converter including a CPA in accordance with another embodiment of the present invention.

FIG. 3 shows a torque converter 210 including a CPA 212 in accordance with another embodiment of the present invention. Torque converter 210 is configured in the same manner as torque converter 10 except that masses 214a, 214b of CPA 212 are different from masses 82a, 82b of CPA 80. CPA 212 includes cover plate 36, which at a radially outer end thereof is provided with two sets of masses—a set of masses 214a facing a rear cover side of torque converter 210 and a set of masses 214b facing a front cover side of torque converter 210—on opposite axial sides of cover plate 36. Each set of masses 214a, 214b includes a plurality of masses circumferentially offset from each other. In one preferred embodiment, CPA 212 includes four masses 214a and four masses 214b.

In the same manner as masses 82a, 82b, masses 214a, 214b are circumferentially movable with respect to cover plate 36 by rollers 84 that are each received in slots in cover plate 36 and both masses 214a, 214b of the respective set. Each mass 214a, 214b includes an inner circumferential surface and an outer circumferential surface 218. Extending between the inner circumferential surface and outer circumferential surface 218, masses 214a, 214b each include respective a radially extending section 220a, 220b, which is perpendicular to center axis 11 (FIG. 1).

At a radially outermost end of the respective radially extending section 220a, 220b, masses 214a, 214b each includes a respective axial protrusion, in the form of an axially extending folded portion 224a, 224b protruding from radially extending section 220a, 220b away from cover plate 36. Folded portions 224a, 224b are each formed integrally with the respective radially extending section 220a, 220b as a single piece. Masses 214a each include a folded portion 224a protruding axially away from radially extending section 220a toward rear cover 14 and masses 214b each include a folded portion 224b protruding axially away from radially extending section 220b toward front cover 12. Accordingly, folded portion 224a protrudes axially past a rear side radially extending 226a of radially extending section 220a and wing folded portion 224b protrudes axially past a front side radially extending surface 226b of radially extending section 220b. Folded portion 224a includes an axially extending section 228a including outer circumferential surface 218 extending axially away from radially extending section 220a and a radially extending folded section 230a, which is axially offset from radially extending section 220a, extending radially inward from axially extending section 228a toward center axis 11 (FIG. 1). Similarly, folded portion 224b includes an axially extending section 228b including outer circumferential surface 218 extending axially away from radially extending section 220b and a radially extending folded section 230b, which is axially offset from radially extending section 220b, extending radially inward from axially extending section 228b toward center axis 11. Radially extending folded sections 230a, 230b are folded away from respective axially extending sections 228a, 228b into contact with respective radially extending surfaces 226a, 226b and are arranged parallel to radially extending section 220a, 220b and approximately perpendicular to center axis 11 (FIG. 1).

In this embodiment, folded portions 224a, 224b each extend along the entire circumferential length of the outer circumferential surface 218 of the respective mass 214a, 214b. In other embodiments, folded portions 224a, 224b may be split into two sections in a manner similar to wing 114 in FIGS. 2a, 2b. An axial rearmost surface 232a of folded portion 224a extends axially past an axial frontmost surface 20a of turbine 20 and an axial frontmost surface 232b of folded portion 224b extends axially past an axial rearmost surface 58a of spring retainer 58. Folded portions 224a, 224b each include a respective axially extending inner circumferential surface 234a at a radially inner edge of the respective radially extending folded section 230a, 230b. Inner circumferential surface 234a extends axially away from radially extending section 220a to axial rearmost surface 232a and inner circumferential surface 234b extends axially away from radially extending section 220b to axial rearmost surface 232*b*. Folded portions 224*a*, 224*b* utilize previously unused space, specifically space radially outside of frontmost surface 20*a* and space radially outside of rearmost surface 58*a*, to increase the intermediate inertia provided by CPA 212 in comparison with CPAs including conventional masses.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A centrifugal pendulum absorber for a torque converter comprising:
    a center plate;
    a roller received in a roller slot formed in the center plate; and
    a first mass on a rear axial side of the center plate and a second mass on a front axial side of the center plate, the first and second masses being slidable with respect to the center plate along the roller slot, the first mass including a first radially extending section and a first axial protrusion extending axially past a rear-side radially extending axially facing surface of the first radially extending section, the rear-side radially extending axially facing surface extending radially outward from an inner circumference of the first mass to the first axial protrusion, the first axial protrusion extending axially beyond all portions of the rear-side radially extending axially facing surface of the first mass, the second mass including a second radially extending section and a second axial protrusion extending axially past a front-side radially extending axially facing surface of the second radially extending section, the front-side radially extending axially facing surface extending radially outward from an inner circumference of the second mass to the second axial protrusion, the second axial protrusion extending axially beyond all portions of the front-side radially extending axially facing surface of the second mass.

2. The centrifugal pendulum absorber as recited in claim 1 wherein the first and second masses each include an outer circumferential surface, each of the axial protrusions being at the respective outer circumferential surface.

3. The centrifugal pendulum absorber as recited in claim 1 wherein the first and second axial protrusions are formed by first and second wings, the first wing including a rear-facing axial free end, the second wing including a front-facing axial free end.

4. The centrifugal pendulum absorber as recited in claim 3 wherein the first wing includes a first axially extending inner circumferential surface extending axially away from the rear-side radially extending axially facing surface of the first radially extending section toward the first free axial end, the second wing including a second axially extending inner circumferential surface extending axially away from the front-side radially extending axially facing surface of the second radially extending section toward the second free axial end.

5. The centrifugal pendulum absorber as recited in claim 4 wherein the first wing and second wings extend parallel to a center axis of the centrifugal pendulum absorber.

6. The centrifugal pendulum absorber as recited in claim 1 wherein the first and second axial protrusions are formed by first and second folded portions, the first folded portion including a first radially extending folded section axially offset from the first radially extending section, the second folded portion including a second radially extending folded section axially offset from the second radially extending section.

7. The centrifugal pendulum absorber as recited in claim 6 wherein the first folding portion includes a first axially extending section extending from the first radially extending section to the first radially extending folded section, the second folding portion including a second axially extending section extending from the second radially extending section to the second radially extending folded section.

8. The centrifugal pendulum absorber as recited in claim 7 wherein the first folded portion includes a first axially extending inner circumferential surface at a first radially inner edge of the first radially extending folded section, the second folded portion includes a second axially extending inner circumferential surface at a second radially inner edge of the second radially extending folded section.

9. The centrifugal pendulum absorber as recited in claim 6 wherein the first radially extending folded section is folded against the rear-side radially extending axially facing surface of the first radially extending section, the second radially extending folded section is folded against the front-side radially extending axially facing surface of the second radially extending section.

10. The centrifugal pendulum absorber as recited in claim 1 wherein the first mass includes a first slot extending through the rear-side radially extending axially facing surface and the second mass includes a second slot extending through the front-side radially extending axially facing surface, the first slot and the second slot receiving the roller.

11. A torque converter comprising:
    a turbine;
    the centrifugal pendulum absorber as recited in claim 1, an axial rearmost surface of the first axial protrusion extending axially past an axial frontmost surface of the turbine.

12. The torque converter as recited in claim 11 further comprising a spring retainer, an axial frontmost surface of the second axial protrusion extending axially past an axial rearmost surface of the spring retainer.

13. A method of forming a centrifugal pendulum absorber for a torque converter comprising:
    forming a first mass including a first radially extending section and a first axial protrusion;
    forming a second mass including a second radially extending section and a second axial protrusion;
    providing a roller in a slot in a center plate; and
    providing the first and second masses on the roller such that the first and second masses are slidable with respect to the center plate, the first axial protrusion extends axially past a rear-side radially extending axially facing surface of the first radially extending section, and the second axial protrusion extends axially past a front-side radially extending axially facing surface of the second radially extending section, the rear-side radially extending axially facing surface extending radially outward from an inner circumference of the first mass to the first axial protrusion, the first axial protrusion extending axially beyond all portions of the rear-side radially extending axially facing surface of the first mass, the front-side radially extending axially facing surface extending radially outward from an inner circumference of the second mass to the second axial protrusion, the second axial protrusion extending axially beyond all portions of the front-side radially extending axially facing surface of the second mass.

14. The method as recited in claim 13 wherein the first and second masses each include an outer circumferential surface, each of the axial protrusions being at the respective outer circumferential surface.

15. The method as recited in claim 13 wherein the first and second axial protrusions are formed by first and second wings, the first wing including a rear-facing axial free end, the second wing including a front-facing axial free end.

16. The method as recited in claim 15 wherein the first wing includes a first axially extending inner circumferential surface extending axially away from the rear-side radially extending axially facing surface of the first radially extending section toward the first free axial end, the second wing including a second axially extending inner circumferential surface extending axially away from the front-side radially extending axially facing surface of the second radially extending section toward the second free axial end.

17. The method as recited in claim 13 wherein the first and second axial protrusions are formed by first and second folded portions, the first folded portion including a first radially extending folded section axially offset from the first radially extending section, the second folded portion including a second radially extending folded section axially offset from the second radially extending section.

18. The method as recited in claim 17 wherein the first folding portion includes a first axially extending section extending from the first radially extending section to the first radially extending folded section, the second folding portion including a second axially extending section extending from the second radially extending section to the second radially extending folded section.

19. The method as recited in claim 18 wherein the first folded portion includes a first axially extending inner circumferential surface at a first radially inner edge of the first radially extending folded section, the second folded portion includes a second axially extending inner circumferential surface at a second radially inner edge of the second radially extending folded section.

20. A centrifugal pendulum absorber for a torque converter comprising:
a center plate;
a roller received in a roller slot formed in the center plate; and
a first mass on a rear axial side of the center plate and a second mass on a front axial side of the center plate, the first and second masses being slidable with respect to the center plate along the roller slot, the first mass including a first radially extending section and a first axial protrusion extending axially past a rear-side axial surface of the first radially extending section, the second mass including a second radially extending section and a second axial protrusion extending axially past a front-side axial surface of the second radially extending section,
wherein the first and second axial protrusions are formed by first and second folded portions, the first folded portion including a first radially extending folded section axially offset from the first radially extending section, the second folded portion including a second radially extending folded section axially offset from the second radially extending section.

* * * * *